C. KADER.
AUTOMATIC WEIGHING MACHINE.
APPLICATION FILED SEPT. 26, 1919.

1,350,611.

Patented Aug. 24, 1920.
4 SHEETS—SHEET 1.

Inventor
E. Kader
by F. Dittmar
Attorney

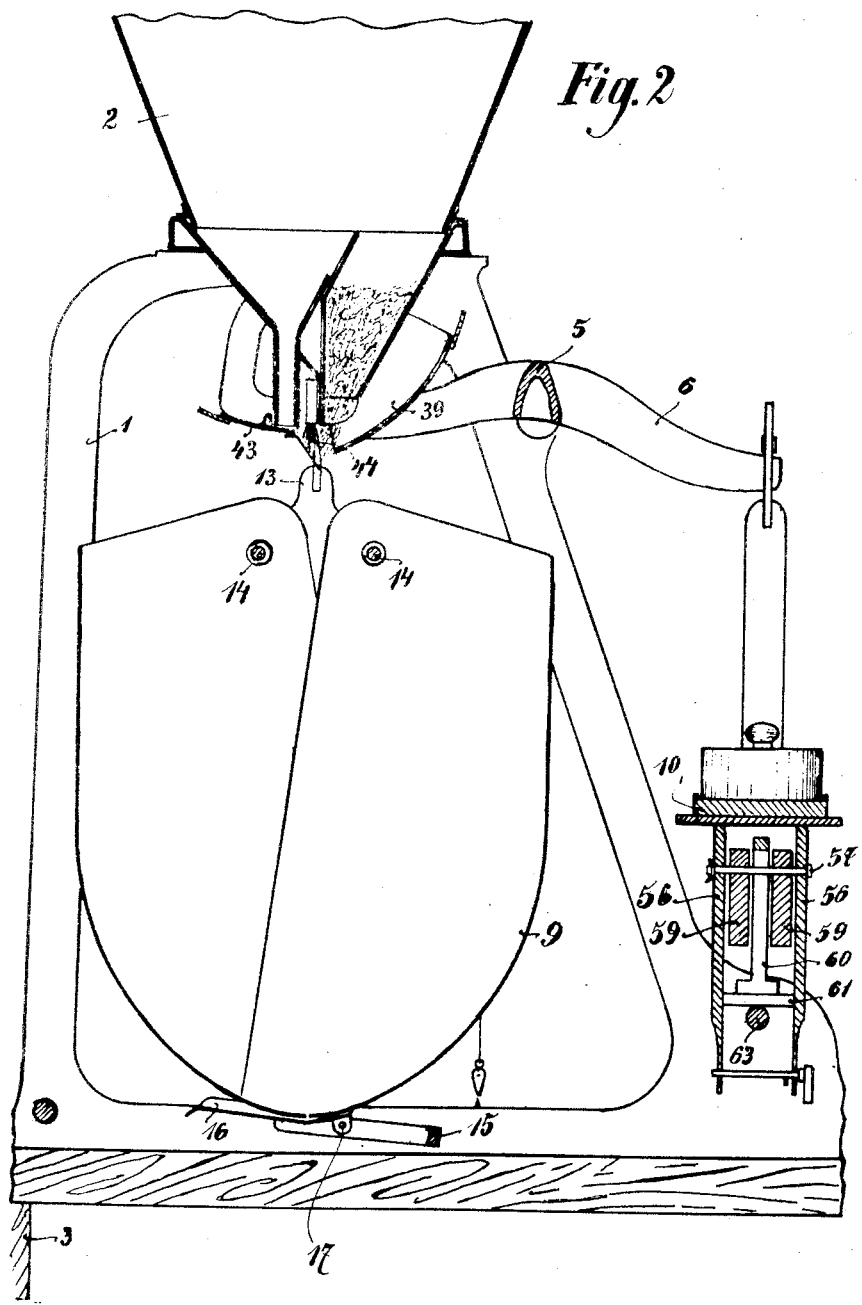

C. KADER.
AUTOMATIC WEIGHING MACHINE.
APPLICATION FILED SEPT. 26, 1919.
1,350,611.
Patented Aug. 24, 1920.
4 SHEETS—SHEET 3.
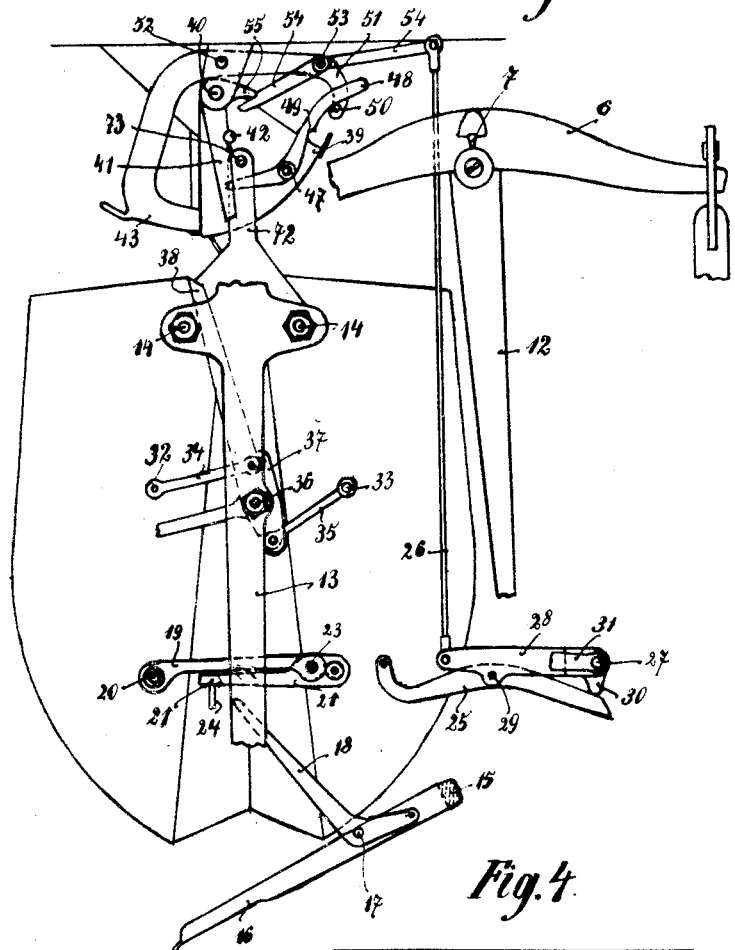
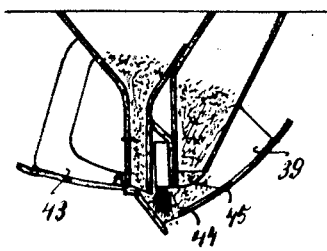

C. KADER.
AUTOMATIC WEIGHING MACHINE.
APPLICATION FILED SEPT. 26, 1919.
1,350,611.
Patented Aug. 24, 1920.
4 SHEETS—SHEET 4.
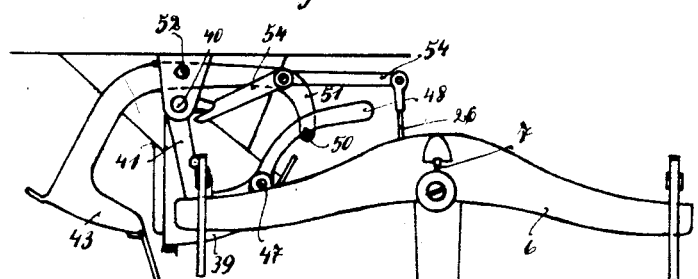
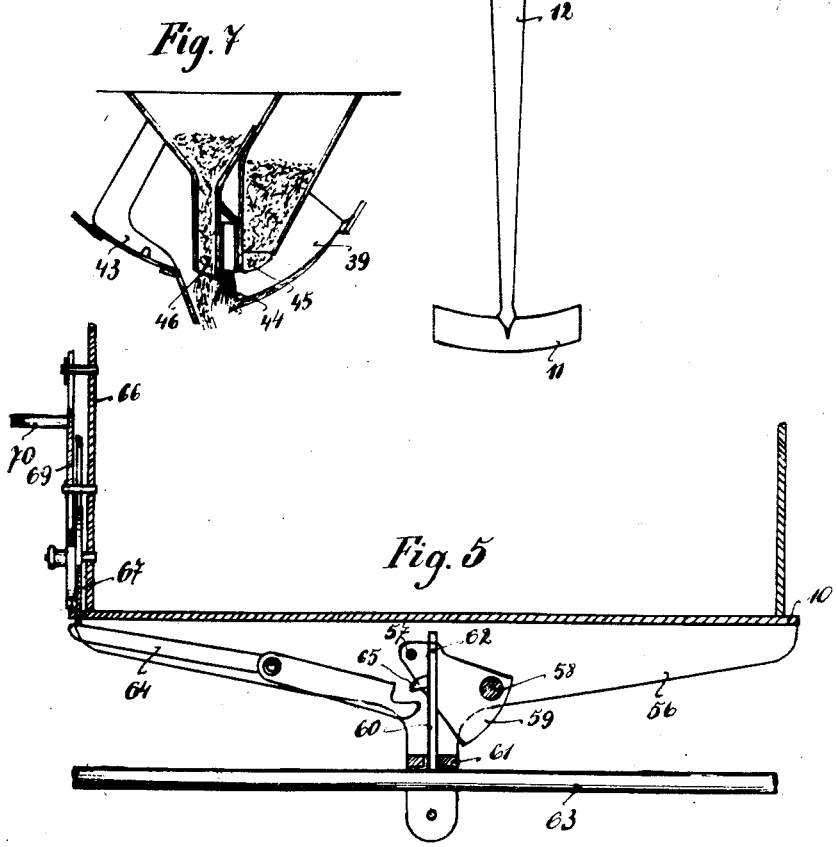

UNITED STATES PATENT OFFICE.

CARL KADER, OF HENNEF, GERMANY, ASSIGNOR, BY MESNE ASSIGNMENTS, TO OBRIMA AUTOMATISCHE WAAGENBAU-ACTIENGESELLSCHAFT, OF MUNICH, GERMANY.

AUTOMATIC WEIGHING-MACHINE.

1,350,611.   Specification of Letters Patent.   Patented Aug. 24, 1920.

Application filed September 26, 1919. Serial No. 326,676.

*To all whom it may concern:*

Be it known that I, CARL KADER, citizen of Germany, residing at Hennef-on-the-Sieg, Germany, have invented certain new and useful Improvements in Automatic Weighing-Machines, of which the following is a specification, reference being had therein to the accompanying drawings.

My invention relates to an improved automatic weighing-machine for continuous use, principally destined for ascertaining the weight of granular goods, which, however, may be equally employed for weighing fluid matter, if suitable receptacles are used.

Weighing machines have been constructed and used before, in which the receptacles containing the goods to be weighed, have been constructed of two parts in the known manner employed for conveying goods, the means for filling said receptacles being provided with a main filling conduit and a bypass conduit. As in other weighing-machines of the kind, the improved machine of my invention is provided with shutting traps suspended to swing like a pendulum, the larger one of said traps being destined to open first for the main feeding action, while the smaller trap remains closed till the coarse weighing action has been finished and the larger trap has been shut.

From the known weighing machines of this kind my improved machine particularly differs in the means for opening and discharging the weighing receptacles, as also in the means for feeding the goods into the receiving receptacle, in connection with the means for checking the discharge. My invention further, has reference to means for compensating the loss of weight occasioned by dispersion of the goods, *i. e.* of a certain fractional part of its total weight.

According to my invention, the two shutting traps of the feeding device are so coupled to each other, that the larger trap, on shutting the main entrance gap, opens the smaller trap by its over-weight, whereupon the fine weighing function sets in; the latter one being finished, the coupling between the two traps is automatically disengaged, thus allowing the smaller trap to close by its own weight.

Further improvements of my invention and particularities of construction will be evident from the following description and by the appending claims.

In the drawings,

Fig. 2 is a vertical section through the same showing the weighing receptacle closed;

Fig. 3 is a side-elevation of the machine, the forward portion of the frame being removed and the weighing receptacle opened;

Fig. 4 shows a vertical section through the feeding device when closed;

Fig. 5 is a vertical longitudinal section through the basin of the balance, with sundry parts arranged below the same and at its side;

Fig. 6 is a side-elevation of the feeding device, the small distributing trap being shown open;

Fig. 7 is a vertical section of the parts shown in Fig. 6.

Figure 1:
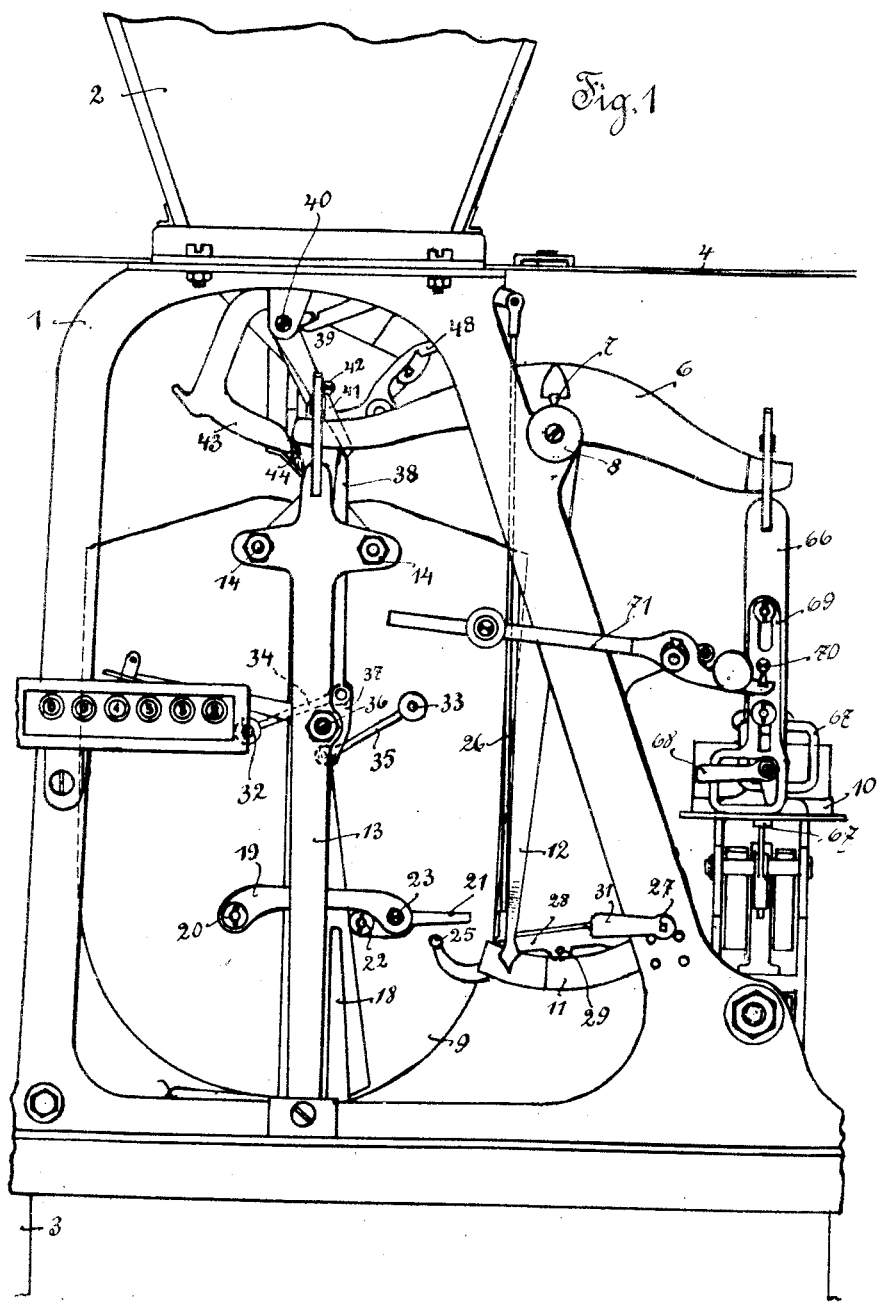
Figure 1 is a side-elevation of my improved weighing machine.

In the said drawings, 1 designates the frame of the weighing machine; 2 designates the hopper or funnel, and 3 is the underframe. The mechanism of the balance, located within the frame 1, is surrounded by protecting walls 4. The beams 6 of the balance, connected to each other by traverse-bar 5, are supported with their prism-edges 7 within steps 8, carried by brackets formed outside to the sloping stays of the frame 1. To the ends of the interior arms of the levers of the balance-beams the weighing receptacle 9 is hung in the usual manner by two edges, while to the outer ends of said lever-arms of said beams the weighing scale 10 is hung in a similar manner. To one of the weighing beams the index 12, extending downward across the sector 11, is secured.

The said weighing receptacle 9 is formed of two parts according to the known manner of gripping implements employed in conveying means. The said two parts of the receptacle tightly shut up against each other at their lower ends; each of said parts is pivotally hung to a stud 14 carried by the common guide-rod 13. Below the discharge opening at the lower end of said parts a tilting escape 16, pivoted to the rear part of the receptacle, as at 17, is hung, said escape being pressed upward against the receptacle by a counter-weight 15. To one of the levers which form the counterweight to said escape an upwardly extending arm 18 is secured, which lever is swung upward to close the aperture between the two halves of the receptacle as soon as the goods have been discharged. The device for shutting the two halves of the receptacle against each other consists of a lever-mechanism similar to that employed for stoppering bottles. The forward half of the receptacle carries a connecting-rod 19 jointed as at 20, while to the rearward half of the receptacle a single-armed lever 21 is pivoted as at 22. The connecting-rod 19 extends up to the joint 23 of lever 21. If said lever 21 has been swung to point to the right side, as shown in Fig. 1, the receptacle is closed, while, when the said lever 21 has been swung to the left side, as shown in Fig. 3, the receptacle is open and the two halves are spread asunder. In the latter position the lever 21 rests on a projecting stay 24 secured within the left-hand or forward half of the receptacle. Now, when the arm 18 is swung upward, its free end will throw the said lever 21 again to the right side and it will carry the connecting-rod 19 along and the closed position as shown in Fig. 1 will be restored.

For opening the device, as described, a tilting lever 25 is arranged to strike against the said lever 21 when in its closed position of Fig. 1. Said lever 25 is controlled by a rod 26 suspended to the mechanism of the feeding device. Said rod 26 engages one end of a single-armed lever 28, to which the double-armed lever 25 is linked, as at 29. The said lever 28 is linked to the frame as at 27. The said pivot 27 is provided with a thumb to be turned by hand, said thumb 30, when turned by the handle 31, serves to place the lever 25 out of action when the operation of the weighing machine is to be controlled.

Above the described device for closing and opening the receptacle two studs 32, 33, are secured to the two halves of the receptacle, which studs serve to transmit oscillatory motion to a double-armed lever 37 fulcrumed to the guide-rod 13 as at 36 by means of connecting rods 34, 35; said oscillatory movement of lever 37 has for its purpose to press toward the left hand side the longer arm 38 of said lever 37. The said arm 38 has for its purpose to retain in its open position the larger feeding trap 39 till about four fifths of the charge to be weighed have run out. Said retaining action of the trap 39 is brought about by an arm 41 pivoted as at 40, the free end of said arm 41 engaging the rear end of the lever-arm 38, as shown in Fig. 1, while the side of said arm 41 bears against a stud 42 projecting from the lateral sector of the larger filling-trap, thereby holding said trap in the open position. When the said receptacle descends, having received about four fifths of the charge, the lever-arm 38 comes free from the retaining arm 41, thereby allowing the said arm 41 to be swung to the left and to release the larger trap 39 for being closed.

The said trap 39, when closing, simultaneously acts as an opening operation on the smaller trap 43, which, up to that time, had been held with its obturating edge against the left side of a brush of a common type 44. Said opening operation is caused through the oscillation of the larger trap transmitted by means of a suitable leverage. Said brush 44 separates the two feeding gaps 45 and 46, the former one being the larger gap for the main entrance and the latter the smaller gap for the by-pass entrance. The larger gap remains open till about four fifths of the total charge have passed through, whereupon it becomes closed by automatical means, as described; the smaller gap, simultaneously opens, as described, and remains open, till the full charge has been weighed.

The motion of the two traps and the transmission of said motion to the remaining mechanism is brought about by the following means. To the lower edge of the sector 39 of the larger trap a stud 47 has been secured to which a double-armed lever 48 is pivoted, the upwardly extending arm of said lever having a notch 49 in its side, destined to engage a stud 50 of a lever 51 rigidly connected to the smaller trap 43, which is carried by the extension of said lever 51 beyond its fulcrum 52, Fig. 3. While the larger trap 39 is open, the smaller trap 43 will remain closed on account of its over-weight against the lever 51. To said lever-arm 51 a double-armed lever 54 is linked as at 53; to the outwardly extending arm of said lever 54 the connecting-rod 26 has been hung, as has already been mentioned, while the inner arm of said lever 54 catches below a thumb 55 rigidly secured to the shaft of the trap 39.

In Fig. 2 I have shown a cross-section and in Fig. 5 an elevation of the means for compensating for the loss of weight caused by dispersion. Below the carrier 10 of the weight two cheeks 56 have been secured, between which two pendulum-weights 59 firmly connected to each other by a cross-pin 58 are suspended to a traversing rod 57. Between the said two weights 59 a support 60 has been hung within a vertical guide 61, said support being suspended to the weights in their center of motion 62. The said weights, accordingly, will press the said support 60 downward against a rod 63 secured to the frame 1 of the machine. Owing to the weight of said levers a certain portion, say about one fifth part of the total weight resting on the scale 10, will be taken up, thus insuring, that only about four fifths of said total weight are registered, as long as the said support 60 is pressing on the rod 63. Only when the said support has been removed from the rod 63 by the upward motion of the scale 10, the full weight encumbering said scale will be weighed. The said support 60 will be removed from the rod 63 in the same moment where the larger trap is closed and the smaller trap is opened. The remaining part of the goods, accordingly, will run down gradually through the smaller feeding gap or by-pass, till the full weight has been reached.

The device last described may be put out of use for the sake of controlling the weighing operation. In such case the support 60 with the weights 59 must be lifted. Such lifting is obtained by means of the double-armed lever 64, which, through engagement with a projecting nose 65 raises the support 60 and holds it in the suspended position. The said lever 64 is actuated by means of a slide-bar 67 reversibly arranged at the side of the scale 10 and to which motion is imparted through a reversible lever 68 carrying a thumb. Said lever 68, further, carries another thumb by which another slide 69 may be shifted in an opposite direction to the slide 67. The said slide 69 carries a stud 70 engaged by an adjusting lever 71, Fig. 1. This lever 71 may be put out of use by reversing the lever 68, if the weighing operation is to be controlled.

The working order of the weighing-machine before described is as follows:

Through the open gap of the larger entrance-trap 39, first, about four fifths of the total amount to be weighed are running into the closed receptacle. During such feeding the remaining one fifth is taken up by the supporting device below the weighing beam before described. After the four fifths of the total weight have been filled in, the supporting device comes out of action and the receptacle, simultaneously, has moved downward so far that the lever 41, which, hitherto, had been retained by the arm 38, comes free and swings to the left, whereby the larger trap with the larger entrance gap becomes closed. Owing to the motion of the larger trap the smaller trap is carried along through the engagement of the lever 51 with the notch 49 of lever 48, and opened owing to the over-weight of said large trap. The goods to be weighed, now, slowly runs down through the smaller gap to complete the total weight. The receptacle gradually descends under the weight until a stud 73 projecting from the suspending lug 78 of the receptacle engages the shorter, left-hand end of lever 48 and sets free the stud 50, thereby allowing the smaller trap to automatically close. The receptacle, being now filled up, may then be opened and discharged. Said opening is obtained by the lever 25 striking against the lever 21. Said lever 25 and its controlling lever 28 having, in the meantime, been sufficiently raised by the closing action of the smaller trap, and the end of the lever 54 having been locked by the thumb 55, the end of said lever 25 will have come in due course into reach of lever 21. As soon as the two parts enter into contact the lever 21 will be raised and reversed under the action of the connecting-rod 19, whereby the two halves of the receptacle are opened and the contents discharged on the regulator 16, which tilts under the weight of the goods and causes the goods to run out. The said regulator, then, is raised again by its counter-weight, the arm 18 will strike below the closing lever and return to its upper position. When the receptacle rises again and closes up, the lever-arm 38 will be raised by the rods 34, 35 and presses the arm 41 to the right side into its original position. The larger trap, thereby, is again thrown open and the weighing operation may be renewed.

I claim as my invention:

1. An improved automatic weighing machine for continuous use, comprising two oscillating closing traps of unequal size, the larger one of said traps offering the main entrance gap into the receptacle and the smaller trap providing a by-pass gap retained in the closed position until the larger trap closes, means for coupling the said two traps to each other in such a manner, that the larger trap will open the smaller trap by its over-weight as it closes, means for automatically uncoupling the two traps at the end of each weighing operation by the sinking motion of the receptacle, and means for automatically closing the smaller trap through its proper weight at the end of each operation.

2. An improved automatic weighing machine for continuous use, comprising two oscillating closing traps of unequal size, the larger one of said traps offering the main entrance gap into the weighing receptacle and the smaller trap providing a by-pass gap retained in the closed position until the larger trap closes, a double-armed lever connected to said larger trap, a double-armed lever connected to the smaller trap, means for making automatically engage said two double-armed levers, means for holding said two double-armed levers in the coupling position, means connected to the weighing receptacle for uncoupling said two double-armed levers, said means being actuated by the sinking motion of the weighing receptacle, means by which the smaller trap is held open, means under control of the receptacle which releases this holding means, and means for automatically closing the smaller trap by its own weight at the end of each weighing operation.

3. An improved automatic weighing machine, comprising a larger entrance-trap and a smaller entrance trap to feed the weighing receptacle, a stud on the larger trap, a double-armed lever connected to the smaller trap, an arm secured to the receptacle, the shaft of said larger trap carrying an elbow-lever loosely mounted to it, one arm of said elbow-lever bearing against said stud on said larger trap and the other arm of said elbow-lever acting against the end of said double-armed lever connected to the smaller trap, the first-named arm of said elbow-lever being engaged by said arm secured to the receptacle to keep the latter in the open position, said open position being released by the sinking motion of the receptacle.

4. An improved automatic weighing machine, comprising a larger and a smaller entrance trap for feeding the weighing receptacle, and means for opening and closing said trap by automatic means, a guide rod, said means consisting of an arm pivoted to said guide-rod, said receptacle consisting of two halves each pivoted to said guide rod, and levers connected to the two halves of the receptacle engaging said arm for raising and lowering the same.

5. An improved automatic weighing machine, comprising a larger and a smaller entrance trap coupled to each other for feeding the weighing receptacle, said receptacle composed of two pivotally connected halves being provided with a tilting regulator and a counter-weight and coöperating means for holding the two halves of the weighing receptacle in their closed position.

6. An improved automatic weighing machine comprising a larger and a smaller entrance trap coupled to each other so that one trap is normally open when the other is closed, means for keeping the smaller trap closed during the coarse weighing, means under control of the poising means for uncoupling the smaller trap during the fine weighing, means for normally supporting part of the counterpoise, and means for rendering said supporting means inoperative if desired.

7. An improved weighing machine comprising a larger and a smaller entrance trap coupled to each other, means for automatically coupling said traps, pendulum weights carried by the scale, means for automatically uncoupling said traps and means for compensating for the portion of the load controlled by the smaller entrance trap, said compensating means consisting of a fixed rod and a support acting against said rod, said support being pivotally connected to said weights and situated between them.

8. An improved automatic weighing machine having a main supply chute and a by-pass, a larger and smaller entrance trap for closing said chute and by-pass respectively, coupling means for said traps such that the by-pass is kept closed until the large trap is opened means automatically controlled by the weighing means for opening and closing said traps, means for reducing the counterpoising action during the first part of the movement of the device, and means for temporarily placing said means out of operation.

In testimony whereof I have affixed my signature in the presence of two witnesses.

CARL KADER.

Witnesses:
 AUG. ROEDERSTEIN.
 AUG. RAUER.